United States Patent
Hendrickson et al.

(10) Patent No.: US 8,069,661 B2
(45) Date of Patent: Dec. 6, 2011

(54) TRANSMISSION HYDRAULIC CONTROL SYSTEM HAVING AN ACCUMULATOR

(75) Inventors: James D. Hendrickson, Belleville, MI (US); Henryk Sowul, Oxford, MI (US); Brian W. Whitmarsh, Commerce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 481 days.

(21) Appl. No.: 12/391,832

(22) Filed: Feb. 24, 2009

(65) Prior Publication Data

US 2010/0216594 A1    Aug. 26, 2010

(51) Int. Cl.
*F16D 31/02* (2006.01)
(52) U.S. Cl. .......................................... 60/417
(58) Field of Classification Search ............... 60/417; 417/34; 477/158; 475/127
See application file for complete search history.

(56) References Cited

U.S. PATENT DOCUMENTS

| | | | | |
|---|---|---|---|---|
| 4,350,220 A | * | 9/1982 | Carman | 180/165 |
| 4,891,941 A | * | 1/1990 | Heintz | 60/416 |
| 5,505,673 A | * | 4/1996 | Tsukamoto et al. | 477/130 |
| 6,378,301 B2 | * | 4/2002 | Endo et al. | 60/414 |
| 6,647,326 B2 | * | 11/2003 | Nakamori et al. | 701/22 |
| 7,905,088 B2 | * | 3/2011 | Stephenson et al. | 60/414 |

FOREIGN PATENT DOCUMENTS

| | | |
|---|---|---|
| DE | 19813982 A1 | 10/1999 |
| DE | 19921301 A1 | 11/1999 |
| DE | 19849488 A1 | 5/2000 |
| DE | 10243282 A1 | 4/2004 |
| DE | 102005029963 A1 | 2/2007 |
| EP | 0475488 A1 | 3/1992 |
| EP | 1826438 A2 | 8/2007 |

* cited by examiner

*Primary Examiner* — Dirk Wright

(57) ABSTRACT

A hydraulic control system for actuating at least one torque transmitting device in a transmission includes a sump, a pump in communication with the sump, and an accumulator. A first control device and a second control device control the communication of hydraulic fluid between the pump, the accumulator, and the torque transmitting device.

10 Claims, 4 Drawing Sheets

TRANSMISSION HYDRAULIC CONTROL SYSTEM HAVING AN ACCUMULATOR

FIELD

The present disclosure relates to a transmission hydraulic control system having an accumulator, and more particularly to a transmission hydraulic control system having an accumulator for actuating a torque transmitting device during an engine restart.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios. In the case of hybrid powertrains using a combination of the internal combustion (IC) engine and electric propulsion, these transmissions have a separate auxiliary electric pump for providing the pressurized hydraulic fluid when the IC engine is turned off. While conventional hydraulic control systems are effective, there is room in the art for improved hydraulic control circuits that reduce the amount of complex components while improving efficiency and controllability of the system during restart of the IC engine.

SUMMARY

The present invention provides a hydraulic control system for actuating at least one torque transmitting device in a transmission. The hydraulic control system includes a sump for receiving and storing a hydraulic fluid and a pump in communication with the sump. The pump includes an outlet and operable to pump the hydraulic fluid from the sump to the outlet. An accumulator is provided for storing and releasing the hydraulic fluid. A first control device is also provided having a first port, a second port, and a third port, wherein the first port of the first control device is in communication with the accumulator and the third port of the first control device is in communication with the at least one torque transmitting device. The first control device includes a valve moveable between at least two positions. The first port of the first control device is in communication with the third port of the first control device when the valve of the first control device is in the first position and the first port of the first control device is in communication with the second port of the first control device when the valve of the first control device is in the second position. A second control device includes a first port in communication with the outlet of the pump, a second port in communication with the second port of the first control device, and a third port in communication with the at least one torque transmitting device. The second control device includes a valve moveable between at least two positions. The first port of the second control device is in communication with the third port of the second control device when the valve of the second control device is in the first position and the second port of the second control device is in communication with the third port of the second control device when the valve of the second control device is in the second position. The accumulator stores the hydraulic fluid when the first control device is in the first position and the second control device is in the first position and the main pump is running, and the accumulator releases the hydraulic fluid when the first control device is in the second position and the second control device is in the second position.

In one aspect of the present invention, the valve of the first control device includes a one way valve between the first port of the first control device and the second port of the first control device. The one way valve permits fluid flow from the first port of the first control device to the second port of the first control device.

In another aspect of the present invention, the valve of the second control device is a ball valve and the ball valve is moveable between the first and second positions by a difference in a fluid pressure communicated from the second port of the first control device and a fluid pressure communicated from the pump.

In yet another aspect of the present invention, the first control device is a solenoid activated valve assembly having a solenoid that actuates the valve of the first control device.

In yet another aspect of the present invention the hydraulic control system further includes a third control device. The third control device includes an inlet in communication with the outlet of the pump and an outlet in communication with the sump. The third control device includes a valve moveable between at least two positions. The valve of the third control device allows selective communication between the inlet and the outlet in order to reduce the pressure of the hydraulic fluid between the pump and the second control device.

In yet another aspect of the present invention, the third control device is a solenoid activated valve assembly having a solenoid that actuates the valve of the third control device.

In yet another aspect of the present invention, the valve of the first control device is moveable to a third position and the first port of the first control device is not in communication with the third port of the first control device and the second port of the first control device when the valve of the first control device is in the third position.

In yet another aspect of the present invention, a method for supplying a hydraulic fluid to at least one torque transmitting device in an automobile is provided. The method includes the steps of operating a main pump that is driven by an engine and that provides the hydraulic fluid to the torque transmitting device and to an accumulator valve, moving the accumulator valve that is in communication with an accumulator into a charge position, wherein the accumulator is in communication with the main pump when the accumulator valve is in the charge position, charging an accumulator with the hydraulic fluid provided from the main pump, determining whether an engine shut-off signal has been received, shutting off the engine if an engine shut-off signal has been received, determining whether an engine start signal has been received, moving the accumulator valve into a discharge position if an engine start signal has been received, wherein the accumulator is in communication with the at least one torque transmitting device when the accumulator valve is in the discharge position, discharging the accumulator to provide the hydraulic fluid to the at least one torque transmitting device, and starting the engine and operating the main pump to provide the hydraulic fluid to the at least one torque transmitting device.

In another aspect of the present invention, the steps of discharging the accumulator and starting the engine occur simultaneously.

In yet another aspect of the present invention, the method includes the step of moving a second valve to a closed position that prevents communication between the accumulator and the main pump when the accumulator is discharged.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
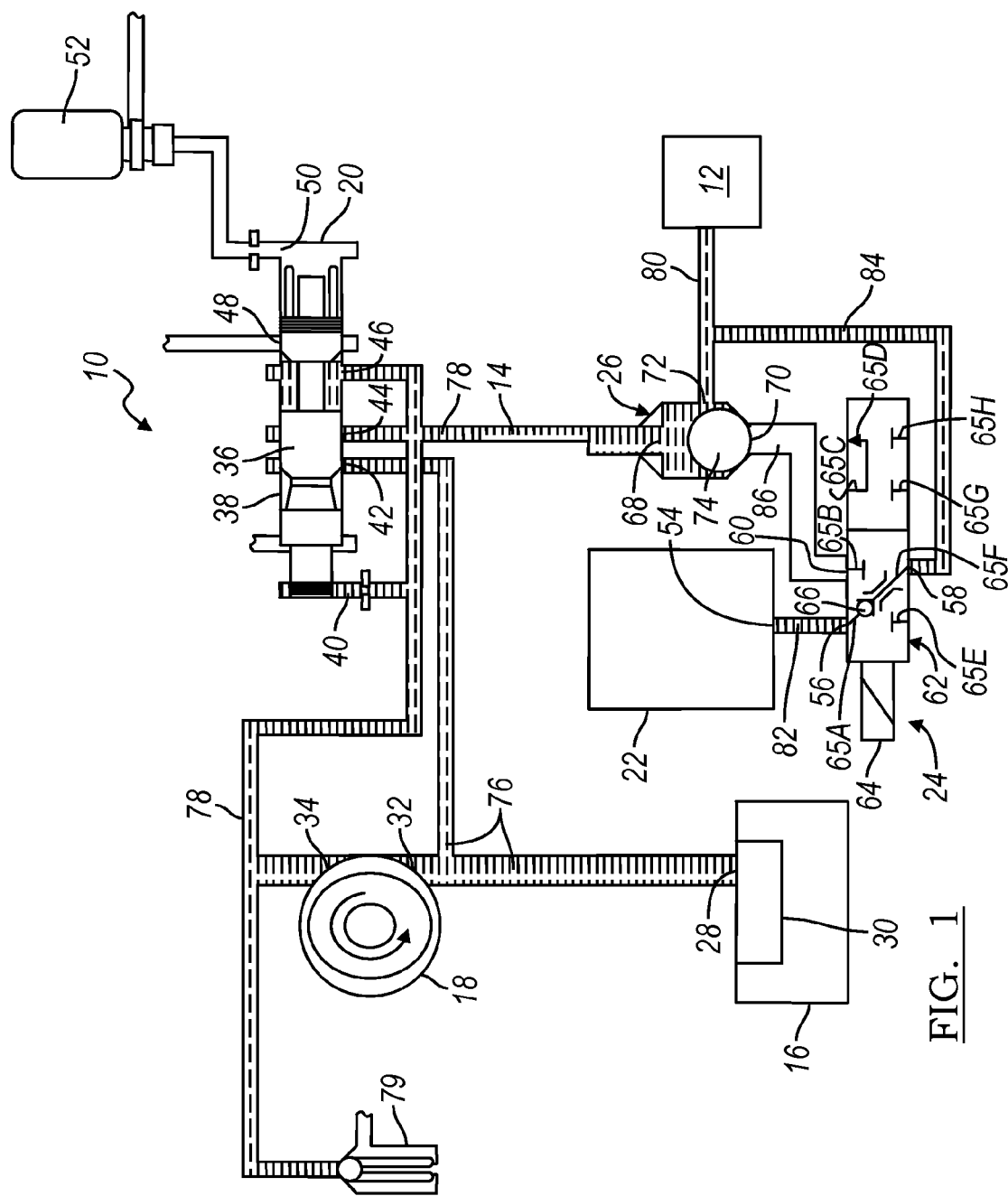
FIG. 1 is a schematic diagram of an embodiment of a hydraulic control system according to the principles of the present invention in a first mode of operation.

With reference to FIG. 1, a hydraulic control system according to the principles of the present invention is generally indicated by reference number 10. The hydraulic control system 10 is preferably employed in an automatic transmission of a motor vehicle having a plurality of torque transmitting devices 12. The torque transmitting devices 12 are hydraulically actuated by a hydraulic fluid 14 and may include friction clutches and/or brakes, though other types of hydraulically actuated torque transmitting devices may be employed without departing from the scope of the present invention. The hydraulic fluid 14 is, for example, an oil conventionally used in automatic transmission systems. The hydraulic control system 10 includes a sump 16, a main pump 18, a pressure regulator valve 20, an accumulator 22, a first control valve 24, and a second control valve 26.

The sump 16 is a reservoir or tank for receiving and storing the hydraulic fluid 14. The sump 16 includes a sump inlet/outlet port 28. The sump 16 preferably includes a sump filter connected 30 to the sump inlet/outlet port 28.

The main pump 18 generally includes an inlet port 32 and an outlet port 34. In the present embodiment, the main pump 18 is preferably a crescent pump, however the main pump 18 may take many forms, such as, for example, an impeller pump, gear pump, or vane pump, without departing from the scope of the present invention. The main pump 18 is preferably driven by an engine (not shown) in the motor vehicle. The main pump 18 is operable to provide a flow of hydraulic fluid 14 to the transmission including the plurality of torque transmitting devices 12, as will be described in greater detail below.

The pressure regulator valve 20 is operable to regulate the pressure of the hydraulic fluid 14 communicated from the main pump 18 and may take various forms without departing from the scope of the present invention. In the example provided, the pressure regulator valve 20 includes a valve 36 slidably disposed in a valve body 38. A plurality of ports are disposed in the valve body 38 and communicate with the valve 36. More specifically, the pressure regulator valve 20 includes a feedback port 40, a bypass port 42, a first inlet port 44, a second inlet port 46, an outlet port 48, and a solenoid actuation port 50. Movement of the valve 36 within the valve body 38 allows for selective communication between the bypass port 42 and the first inlet port 44 and between the second inlet port 46 and the outlet port 48. The valve 36 is actuated by a solenoid 52, such as a variable bleed solenoid, that selectively communicates a pressurized hydraulic fluid to the solenoid actuation port 50. It should be appreciated that the pressure regulator valve 20 may have various other ports and configurations without departing from the scope of the present invention.

The accumulator 22 is an energy storage device in which the non-compressible hydraulic fluid 14 is held under pressure by an external source. In the example provided, the accumulator 22 is a spring type or gas filled type accumulator having a spring or compressible gas that provides a compressive force on the hydraulic fluid 14 within the accumulator 22. However, it should be appreciated that the hydraulic accumulator 22 may be of other types, such as a gas-charged type, without departing from the scope of the present invention. The accumulator 22 includes an inlet/outlet port 54 that allows the hydraulic fluid 14 to communicate in and out of the accumulator 22.

Figure 2:
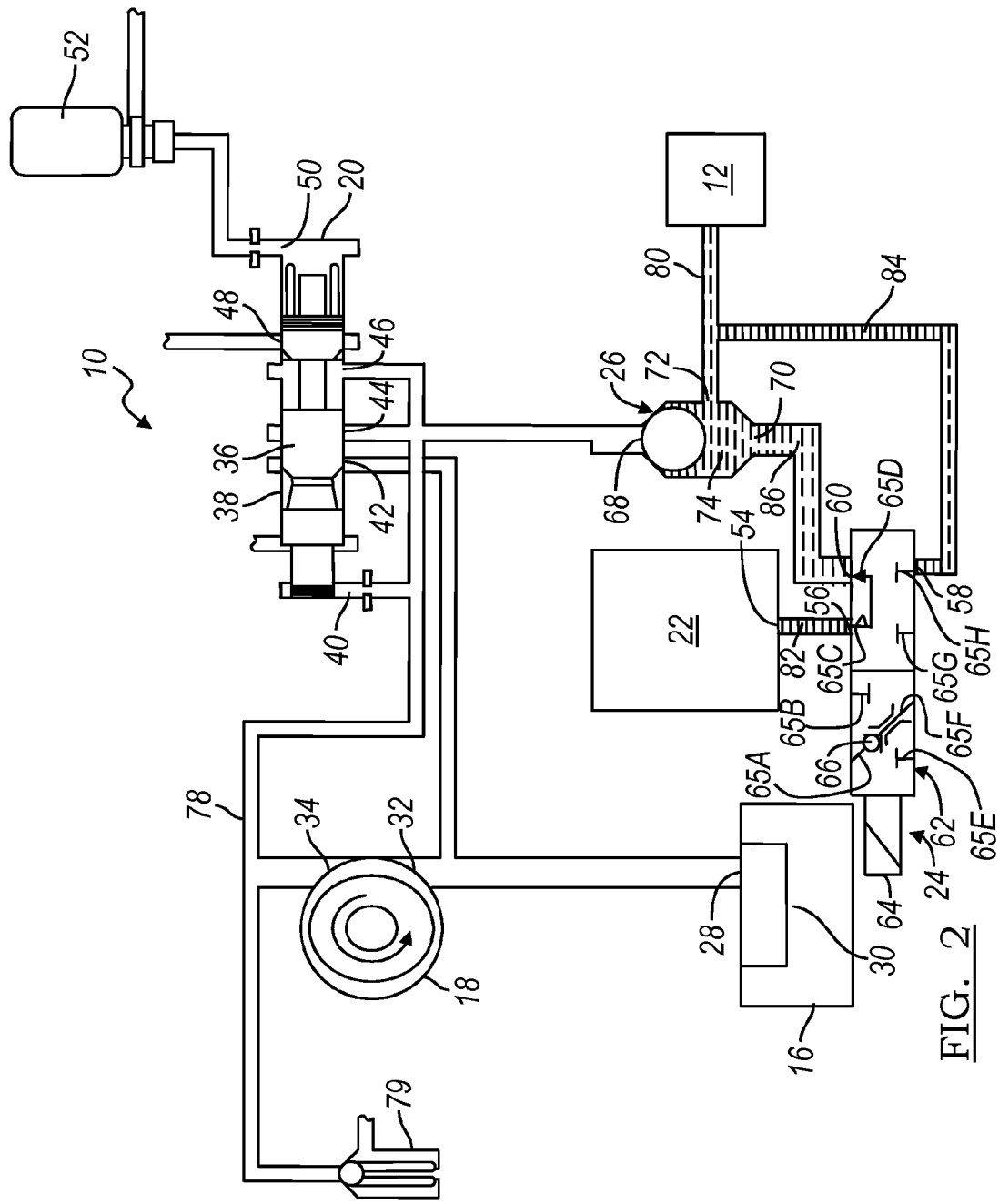
FIG. 2 is a schematic diagram of an embodiment of a hydraulic control system according to the principles of the present invention in a second mode of operation.

The first control device 24 is operable to control the operation of the accumulator 22. The first control device 24 is preferably a two position valve assembly. The first control device 24 includes a first port 56, a second port 58, and a third port 60. The first control device 24 includes a valve 62 moveable between a first position, shown in FIG. 1, and a second position, shown in FIG. 2. The valve 62 is moved by an actuator 64. The valve 62 includes a plurality of ports 65A-H. Ports 65B, 65E, 65G, and 65H are isolated (i.e., they do not communicate to any of the other ports within the valve 62). Port 65A communicates with port 65F via a one-way ball valve 66. The one way ball valve 66 allows fluid communication from port 65F to port 65A and prevents fluid communication from port 65A to port 65F. Port 65C is in fluid communication with port 65D. When the valve 62 is in the first position, the first port 56 is in communication with port 65A, the second port 58 is in communication with port 65F, and the third port 60 is in communication with port 65B. Accordingly, when the valve 62 is in the first position, the first port 56 is in communication with the second port 58 via the one-way ball valve 66 and the third port 60 is hydraulically isolated. Turning to FIG. 2, when the valve 62 is in the second position, the first port 56 is in communication with port 65C, the second port 58 is in communication with port 65H, and the third port 60 is in communication with port 65D. Accordingly, when the valve 62 is in the second position, the first port 56 is in communication with the third port 60 and the second port 58 is hydraulically isolated.

Returning to FIG. 1, the second control device 26 is preferably a two-way ball valve and includes a first port 68, a second port 70, and a third port 72. A ball 74 located within the second control device 26. The ball 74 is moveable between a first position, shown in FIG. 1, that prevents communication between the first and third ports 68, 72 with the second port 70 and a second position, shown in FIG. 2, that prevents communication between the second and third ports 70, 72 with the first port 68.

The hydraulic control system 10 further includes a hydraulic circuit comprised of a plurality of fluid flow paths that communicate the hydraulic fluid 14 between the various components including the sump 16, the main pump 18, the pressure regulator valve 20, the accumulator 22, the first valve 24, and the second valve 26. The fluid flow paths may take various forms without departing from the scope of the present invention including channels, tubes, conduits, and other fluid passages. In addition, each fluid flow path may have various paths, portions, and side channels without departing from the scope of the present invention. For example, a first fluid flow path 76 communicates between the inlet/outlet port 28 of the sump 16 with the port 32 of the main pump 18 and with the first port 42 of the pressure regulator valve 20. A second fluid flow path 78 communicates between port 34 of the main pump 18 and the bypass port 40 of the pressure regulator valve 20, the second port 44 of the pressure regulator valve 20, the third port of the pressure regulator valve 20, the first port 68 of the second control device 26, and a line blow off valve 79. The line blow off valve 79 is operable to open under a specified fluid pressure in order to relieve the fluid pressure within the second fluid flow path 78. A third fluid flow path 80 communicates between the third port 72 of the second control device 26 and the torque transmitting devices 12. A fourth fluid flow path 82 communicates between the inlet/outlet port 54 of the accumulator 22 and the first port 56 of the first control device 24. A fifth fluid flow path 84 communicates between the second port 58 of the first control device 24 and the third fluid flow path 80. It should be appreciated that the third and fifth fluid flow paths 80, 84 can be considered a single fluid flow path without departing from the scope of the present invention. Finally, a sixth fluid flow path 86 communicates between the third port 60 of the first control device 24 and the second port 70 of the second control device 26.

The operation of the hydraulic control system 10 will now be described. The hydraulic control system 10 operates in at least two modes: a first mode, shown in FIG. 1, wherein the main pump 18 provides pressurized hydraulic fluid 14 to the torque transmitting device 12, and a second mode, shown in FIG. 2, where the accumulator provides pressurized hydraulic fluid 14 to the torque transmitting devices 12 in order to charge the torque transmitting devices 12 when the motor vehicle engine is stopped. It should be appreciated that both modes of operation may occur simultaneously, as will be described in greater detail below.

Generally, when the motor vehicle stops (i.e., at a red light for example), the engine shuts off and the main pump 18 stops rotating, so there is no pressure in the hydraulic circuit providing oil to the torque transmitting devices 12. To start the motor vehicle without delay, the hydraulic circuit should be filled with pressurized oil very fast. So, when the operator of the motor vehicle pushes on the accelerator pedal, an electric signal is sent to the actuator 64 in order to move the valve 62 to the second position, thereby allowing the accumulator 22 to discharge and send the oil to the torque transmitting devices 12. However, the accumulator 22 volume is limited. Also, the torque transmitting devices 12 apply hydraulic circuit has leakages, so the oil pressure (pressure of oil from the accumulator 12 which entered the apply circuit of the torque transmitting devices 12) can drop fast. A drop in oil pressure will cause clutch slippage, and the start of the motor vehicle can be delayed or slowed. Also, the torque transmitting devices 12 can burn due to excessive slippage. Therefore, simultaneously with the signal sent to the actuator 64 to discharge the accumulator 22, another signal is sent to start the engine (and the engine will drive the main pump 18). The main pump 18 will start to provide the oil to the apply circuit of the torque transmitting devices 12. In the very beginning, the engine and the main pump 18 are rotating relatively slowly, so the amount of oil going to the apply circuit of the torque transmitting devices 12 is low and not sufficient to lock the clutches and transmit the engine torque to the wheels of the motor vehicle. So, the main function of the accumulator 18 is just to provide the oil to the clutch very fast at high pressure for a short period of time and to minimize the delay of the motor vehicle start. After the engine start, the main pump 18 will provide the oil to the plurality of torque transmitting devices 12.

More specifically, in the first mode of operation, the first control device 24 is in the first position and the main pump 18 is driven by the engine of the motor vehicle. Hydraulic fluid 14 is communicated from the sump 30, through the first fluid flow path 76, through the main pump 18, and through the second fluid flow path 78. Additionally, the hydraulic pressure within the fluid flow path 78 is controlled via the pressure regulator valve 20. More specifically, hydraulic fluid within fluid flow path 78 communicates with ports 44 and 46. By adjusting the position of the valve 36 via the solenoid 52, hydraulic fluid may be bled off to ports 42 and 48, thereby reducing the fluid pressure within fluid flow path 78. In the event of failure of the pressure regulator valve 20, excess hydraulic fluid pressure within fluid flow path 78 may be released through the line blow-off valve 79.

The pressurized hydraulic fluid 14 within fluid flow path 78 is communicated into the second control device 26. The hydraulic fluid 14 contacts the ball 74 and urges the ball 74 against the second port 70, thereby closing the second port 70. The hydraulic fluid 14 exits the second control device 26 and enters the third fluid flow path 80 and is communicated to the torque transmitting devices 12. The pressurized hydraulic fluid 14 delivered to the torque transmitting devices 12 actuates the torque transmitting devices 12. A portion of the hydraulic fluid 14 is diverted through the fifth fluid flow path 84 to the first control device 24. The hydraulic fluid 14 passes through the one-way ball valve 66 within the first control device 24, through the fourth fluid flow path 82 and into the accumulator 22. In this way the main pump 18 charges the accumulator 22.

In the second mode of operation, the engine of the motor vehicle has been shut down to increase efficiency and therefore the main pump 18 is disengaged, as will be described in greater detail below. To initiate the second mode of operation, the valve 62 of the first control device 24 is moved to the second position, shown in FIG. 2. Accordingly, the hydraulic fluid 14 stored within the accumulator 22 is released under pressure. The hydraulic fluid 14 passes through the fourth fluid flow path 82, through first port 56 of the first control device 24, out the third port 60 of the first control device 24, through the sixth fluid flow path 86 to the second port 70 of the second control device 26. The pressurized hydraulic fluid 14 engages the ball 74 and urges the ball 74 against the first port 68, thereby preventing communication to the second fluid flow path 78. The hydraulic fluid 14 then exits the second control device 26 via the third port 72 and enters the third fluid flow path 80 where the hydraulic fluid is communicated to the plurality of torque transmitting devices 12.

Figure 3:
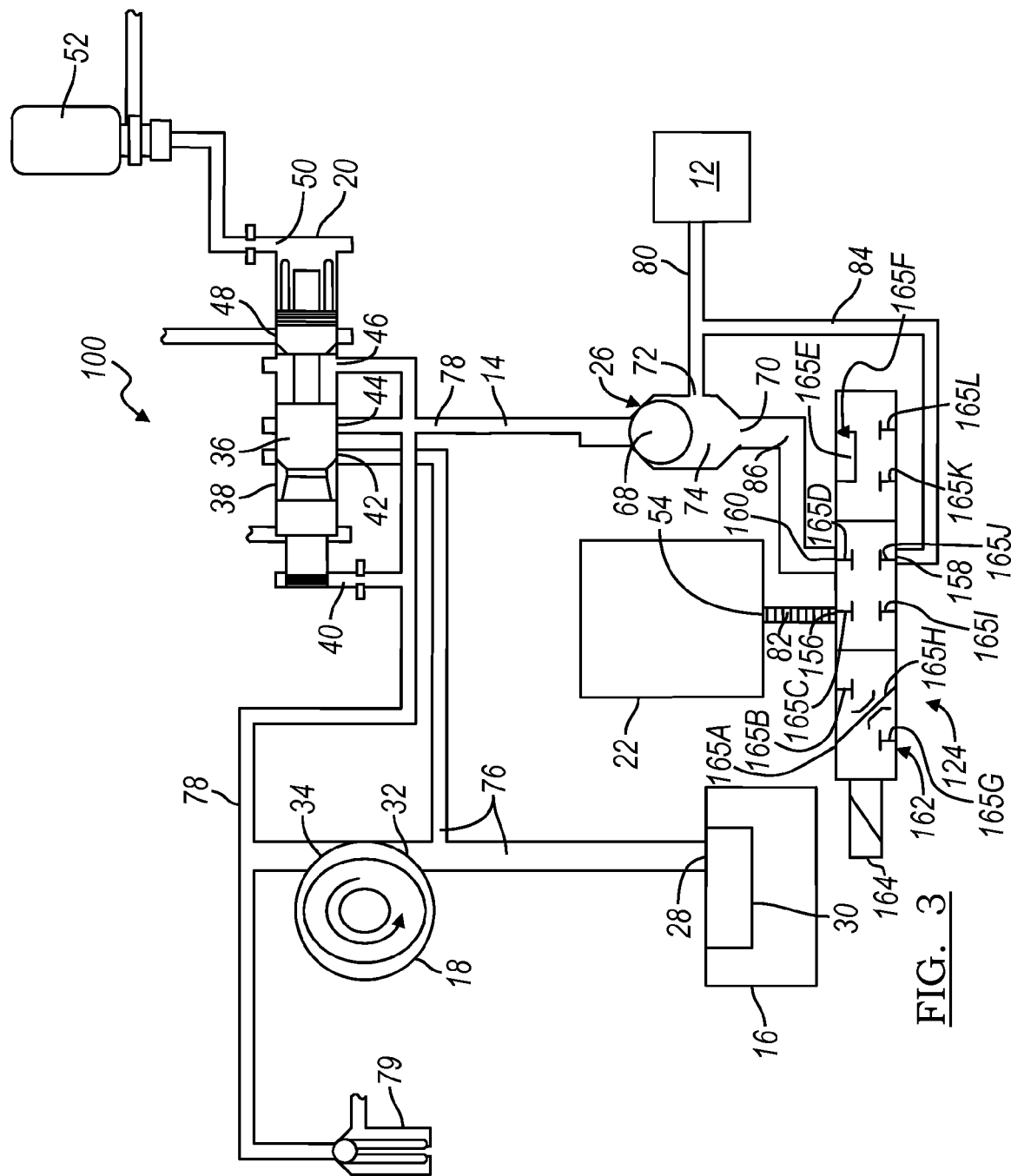
FIG. 3 is a schematic diagram of yet another embodiment of a hydraulic control system according to the principles of the present invention in a first mode of operation.

With reference to FIG. 3, another embodiment of a hydraulic control system is generally indicated by reference number 100. The hydraulic control system 100 is substantially similar to the hydraulic control system 10 shown in FIGS. 1 and 2 and accordingly like components are indicated by like reference numbers. However, the hydraulic control system 100 includes a first control device 124 that replace the first control device 24 shown in FIGS. 1 and 2. The first control device 124 is a three position valve assembly operable to control the operation of the accumulator 22. The first control device 124 includes a first port 156, a second port 158, and a third port 160. The first control device 124 includes a valve 162 moveable between a first position, a second position, and a third position shown in FIG. 3. The valve 162 is moved by an actuator 165. The valve 162 includes a plurality of fluid ports 165A-L. Ports 165B-D, 165G, and 165I-L are hydraulically isolated (i.e. they do not communicate with other ports within the valve 162). Port 165A is in communication with port 165H. Port 165E is in communication with port 165F. When the valve 162 is in the first position, the first port 156 is in communication with port 165A, the second port 158 is in communication with port 165H, and the third port 160 is in communication with port 165B. Accordingly, hydraulic fluid 14 may pass between the first port 156 and the second port 158 and the third port 160 is hydraulically isolated. When the valve 162 is in the second position, the first port 156 is in communication with port 165E, the second port 158 is in communication with port 165L, and the third port 160 is in communication with port 165F. Accordingly, hydraulic fluid 14 may pass between the first port 156 and the third port 160 and the second port 158 is hydraulically isolated. When the valve 162 is in the third position, the first port 156 is in communication with port 165C, the second port 158 is in communication with port 165J, and the third port 160 is in communication with port 165D. Accordingly, each of the first port 156, the second port 158, and the third port 160 are hydraulically isolated. The third position of the valve 162 is used to maintain the pressurized hydraulic fluid 14 within the accumulator.

Figure 4:
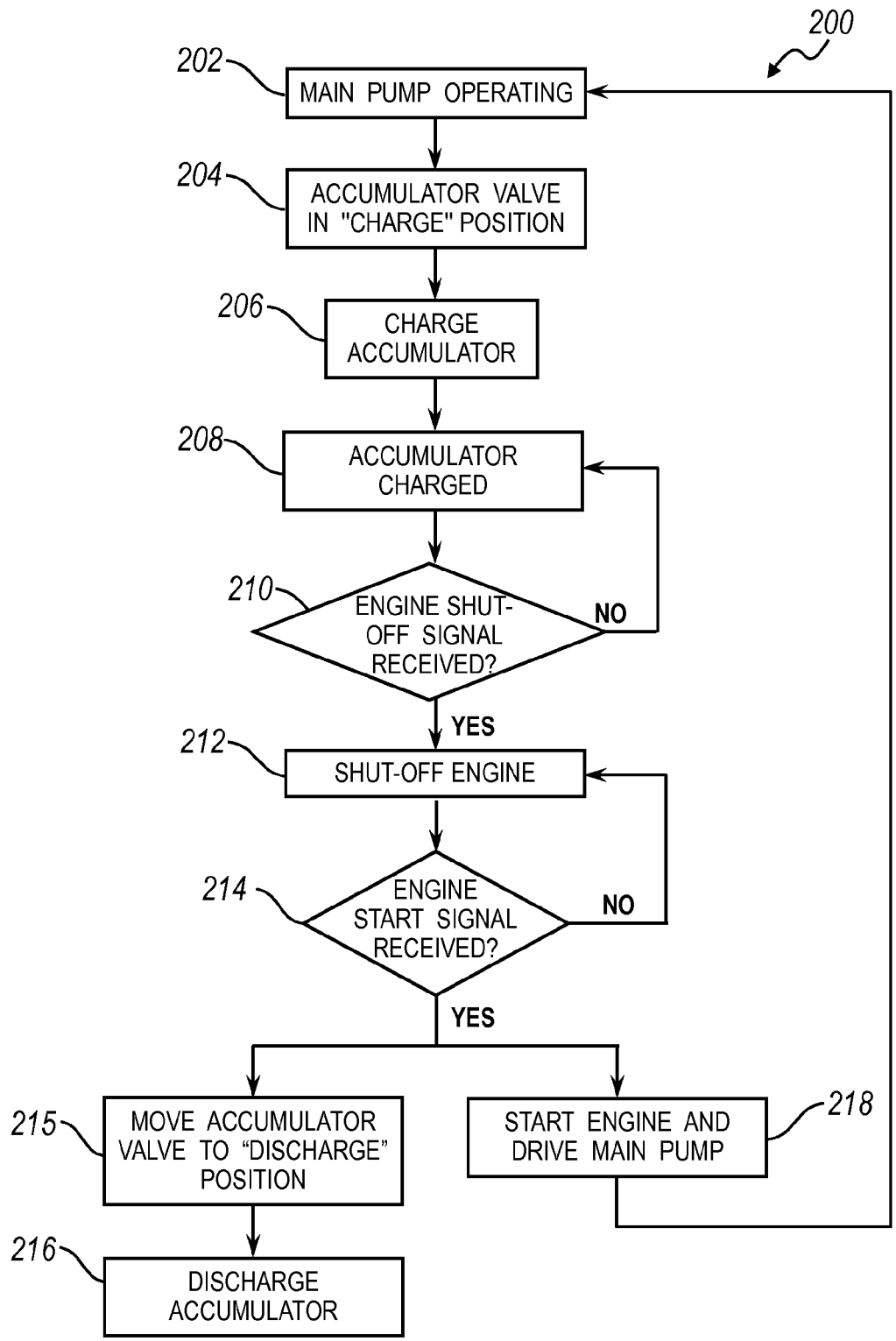
FIG. 4 is a flow chart illustrating a method of operating the hydraulic control system of FIGS. 1-3 according to the principles of the present invention.

Turning to FIG. 4, and with continued reference to FIGS. 1 and 2, a method of operating the hydraulic control system 100 within the context of an exemplary motor vehicle is generally indicated by reference number 200. The method 200 begins at step 202 when the engine of the motor vehicle is running, thereby powering the main pump 18. At step 204 the first control device 24 is placed in the first position or "charge" position such that the main pump 18 communicates with the accumulator 22. Accordingly, the main pump 18 charges the accumulator with pressurized hydraulic fluid 14 at step 206 and as illustrated in FIG. 1. At step 208 the accumulator 22 is fully charged. In the hydraulic control system 10, the valve 66 within the first control device 24 keeps the accumulator 22 charged by preventing the hydraulic fluid from exiting the accumulator 22. In the hydraulic control system 200 shown in FIG. 3, the first control device 124 is moved to the third position at step 208 in order to maintain the charge of hydraulic fluid 14 within the accumulator 22.

The method 200 continues at step 210 where the engine controller determines whether an engine shut-off signal has been received. An engine shut-off signal may be received for various reasons, such as, for example, application of the motor vehicle brake. If no engine shut-off signal is received, the method 200 returns to step 208. If an engine shut-off signal is received, the method 200 proceeds to step 212 where the engine is shut-off in order to increase the fuel efficiency of the motor vehicle. Once the engine has been stopped, the main pump 18 is no longer operable to provide pressurized hydraulic fluid 14 to the plurality of control devices 12. At step 214 the engine controller determines whether an engine restart signal has been received. An engine restart signal may, for example, comprise a signal indicative of brake release. If the engine restart signal has not been received, then the method 200 returns to step 212 and the engine remains off. If the engine start signal is received, the method 200 proceeds to step 215 and step 218. At step 215, the first control device 24 is moved to the second position or "discharge" position, shown in FIG. 2. At step 216 the accumulator 22 is discharged. Accordingly, the accumulator 22 provides pressurized hydraulic fluid 14 to the plurality of torque transmitting devices 12. Simultaneously with steps 215 and 216, the method 200 starts the engine and drives the main pump at step 218. Accordingly, during engine restart, both the accumulator 22 and the main pump 18 provide hydraulic fluid 14 to the plurality of torque transmitting devices 12 for a time as the main pump 18 is reengaged. More specifically, as the fluid pressure within the fluid flow path 78 increases above that of the fluid pressure in fluid flow path 86 provided by the accumulator 22, the ball valve 74 shifts. During transition, both the accumulator 22 and the main pump 18 provide hydraulic fluid to the plurality of torque transmitting devices 12. As the accumulator 22 is discharged, the ball valve 74 returns to the position shown in FIG. 1 and the main pump 18 fully supplies the hydraulic fluid to the plurality of torque transmitting devices 12.

The description of the invention is merely exemplary in nature and variations that do not depart from the gist of the invention are intended to be within the scope of the invention. Such variations are not to be regarded as a departure from the spirit and scope of the invention.

We claim the following:

1. A hydraulic control system for actuating at least one torque transmitting device in a transmission, the hydraulic control system comprising:

a sump for receiving and storing a hydraulic fluid;

a pump in communication with the sump, the pump having an outlet and operable to pump the hydraulic fluid from the sump to the outlet;

an accumulator for storing and releasing the hydraulic fluid;

a first control device having a first port, a second port, and a third port, wherein the first port of the first control device is in communication with the accumulator and the third port of the first control device is in communication with the at least one torque transmitting device, and wherein the first control device includes a valve moveable between at least two positions, wherein the first port of the first control device is in communication with the third port of the first control device when the valve of the first control device is in the first position and wherein the first port of the first control device is in communication with the second port of the first control device when the valve of the first control device is in the second position; and a second control device having a first port in communication with the outlet of the pump, a second port in communication with the second port of the first control device, and a third port in communication with the at least one torque transmitting device, wherein the second control device includes a valve moveable between at least two positions, wherein the first port of the second control device is in communication with the third port of the second control device when the valve of the second control device is in the first position and wherein the second port of the second control device is in communication with the third port of the second control device when the valve of the second control device is in the second position, and wherein the accumulator stores the hydraulic fluid when the first control device is in the first position and the second control device is in the first position and the main pump is running, and wherein the accumulator releases the hydraulic fluid when the first control device is in the second position and the second control device is in the second position.

2. The hydraulic control system of claim 1 wherein the valve of the first control device includes a one way valve between the first port of the first control device and the second port of the first control device, and wherein the one way valve permits fluid flow from the first port of the first control device to the second port of the first control device.

3. The hydraulic control system of claim 1 wherein the valve of the second control device is a ball valve, and wherein the ball valve is moveable between the first and second positions by a difference in a fluid pressure communicated from the second port of the first control device and a fluid pressure communicated from the pump.

4. The hydraulic control system of claim 1 wherein the first control device is a solenoid activated valve assembly having a solenoid that actuates the valve of the first control device.

5. The hydraulic control system of claim 1 further comprising a third control device, the third control device comprising an inlet in communication with the outlet of the pump and an outlet in communication with the sump, wherein the third control device includes a valve moveable between at least two positions, and wherein the valve of the third control device allows selective communication between the inlet and the outlet in order to reduce the pressure of the hydraulic fluid between the pump and the second control device.

6. The hydraulic control system of claim 5 wherein the third control device is a solenoid activated valve assembly having a solenoid that actuates the valve of the third control device.

7. The hydraulic control system of claim 1 wherein the valve of the first control device is moveable to a third position, wherein the first port of the first control device is not in communication with the third port of the first control device and the second port of the first control device when the valve of the first control device is in the third position.

8. A method for supplying a hydraulic fluid to at least one torque transmitting device in an automobile, the method comprising:
 operating a main pump that is driven by an engine and that provides the hydraulic fluid to the torque transmitting device and to an accumulator valve;
 moving the accumulator valve that is in communication with an accumulator into a charge position, wherein the accumulator is in communication with the main pump when the accumulator valve is in the charge position;
 charging an accumulator with the hydraulic fluid provided from the main pump;
 determining whether an engine shut-off signal has been received;
 shutting off the engine if an engine shut-off signal has been received;
 determining whether an engine start signal has been received;
 moving the accumulator valve into a discharge position if an engine start signal has been received, wherein the accumulator is in communication with the at least one torque transmitting device when the accumulator valve is in the discharge position;
 discharging the accumulator to provide the hydraulic fluid to the at least one torque transmitting device; and
 starting the engine and operating the main pump to provide the hydraulic fluid to the at least one torque transmitting device.

9. The method of claim 8 wherein the steps of discharging the accumulator and starting the engine occur simultaneously.

10. The method of claim 8 further comprising the step of moving a second valve to a closed position that prevents communication between the accumulator and the main pump when the accumulator is discharged.

* * * * *